United States Patent
Carminati et al.

(10) Patent No.: US 12,325,777 B2
(45) Date of Patent: Jun. 10, 2025

(54) FLUID FOR CONTROLLING THE PERMEABILITY OF A SUBTERRANEAN FORMATION, AND USE THEREOF

(71) Applicant: ENI S.P.A., Rome (IT)

(72) Inventors: Stefano Carminati, San Donato Milanese (IT); Giuseppe Maddinelli, San Donato Milanese (IT); Davide Moscatelli, Arese (IT); Mattia Sponchioni, Vaiano Cremasco (IT)

(73) Assignee: ENI S.P.A., Rome (IT)

( * ) Notice: Subject to any disclaimer, the term of this patent is extended or adjusted under 35 U.S.C. 154(b) by 211 days.

(21) Appl. No.: 17/267,894

(22) PCT Filed: Aug. 19, 2019

(86) PCT No.: PCT/IB2019/056974
§ 371 (c)(1),
(2) Date: Feb. 11, 2021

(87) PCT Pub. No.: WO2020/035838
PCT Pub. Date: Feb. 20, 2020

(65) Prior Publication Data
US 2021/0163692 A1 Jun. 3, 2021

(30) Foreign Application Priority Data

Aug. 17, 2018 (IT) .......... 102018000008113

(51) Int. Cl.
*C08G 81/02* (2006.01)
*C08F 293/00* (2006.01)
(Continued)

(52) U.S. Cl.
CPC ........ *C08G 81/025* (2013.01); *C08F 293/005* (2013.01); *C09K 8/5083* (2013.01); *E21B 43/16* (2013.01); *C08F 2438/03* (2013.01)

(58) Field of Classification Search
CPC ...... C09K 8/5083; E21B 43/16; C08G 81/025
See application file for complete search history.

(56) References Cited

U.S. PATENT DOCUMENTS

| 3,994,852 A | 11/1976 | Adams et al. |
| 2009/0264321 A1 | 10/2009 | Showalter et al. |

(Continued)

FOREIGN PATENT DOCUMENTS

WO 9526455 A1 10/1995

OTHER PUBLICATIONS

"In Situ-Gelling, Erodible N-Isopropylacrylamide Copolymers", Lee, et al., Macromolecular Bioscience, 2005, 5, p. 625-629. (Year: 2005).*

(Continued)

*Primary Examiner* — Aiqun Li
(74) *Attorney, Agent, or Firm* — CANTOR COLBURN LLP (57) ABSTRACT

A fluid for controlling the permeability of a subterranean formation having an aqueous solution of at least one thermo-responsive polymer with block structure A-B-A', wherein A and A', the same as or different from one another, each represent a thermo-responsive oligomer group, and

B is an oligomer group having n repeat units, the same as or different from one another.

At least one of the repeat units has a solubility of the corresponding monomer, in water at 20° C., equal to or greater than 120 g/l, and n is a whole number within the range 30-1000.

The fluid is also used in a method for controlling the permeability of a subterranean formation.

15 Claims, 1 Drawing Sheet

(51) Int. Cl.
*C09K 8/508* (2006.01)
*E21B 43/16* (2006.01)

(56) References Cited

U.S. PATENT DOCUMENTS

| | | | |
|---|---|---|---|
| 2012/0026465 A1 | 10/2012 | Fitch et al. | |
| 2012/0264655 A1 | 10/2012 | Fitch et al. | |
| 2013/0261266 A1* | 10/2013 | Bunyard | C08F 293/005 525/299 |

OTHER PUBLICATIONS

Rajasekhar T et al, "ABA Type Tri-block Copolymers from Telechelic Polystyrene by Radical Initiation Process"; Conference: PolyTech—2012; DOI: https://www.researchgate.net/publication/281768280_ABA_Type_Triblock_Copolymers from Telechelic Polystyrene by Radical Initiation Process.

Shuquan Cui et al., "Thermogelling of Amphiphilic Block Copolymers in Water: ABA Type versus AB or BAB Type"; Macromolecules 2019, 52, 10, 3697-3715, May 8, 2019; DOI: https://doi.org/10.1021/acs.macromol.9b00534.

International Preliminary Report on Patentability issued Nov. 11, 2020 re: Application No. PCT/IB2019/056974, pp. 1-18.

International Search Report issued Nov. 26, 2019 Re: Application No. PCT/IB2019/056974, pp. 1-6, citing: US 3 994 852 A and Desphande et al. "Influence of polymer . . . ".

Mangesh C. Deshpande et al. "Influence of polymer architecture on the structure of complexes formed by PEG-tertiary amine methacrylate copolymers and phosphorothioate oligonucleotide", Journal of Controlled Release 81, 2002, pp. 185-199.

Written Opinion issued Jun. 22, 2020 re: Application No. PCT/IB2019/056974, pp. 1-5.

Written Opinion issued Nov. 26, 2019 Re: Application No. PCT/IB2019/056974, pp. 1-9, citing: US 3 994 852 A and Desphande et al. "Influence of polymer . . . ".

* cited by examiner

FLUID FOR CONTROLLING THE PERMEABILITY OF A SUBTERRANEAN FORMATION, AND USE THEREOF

TECHNICAL FIELD

The present disclosure relates to a fluid for controlling the permeability of a subterranean formation, and use thereof.

In particular, the present disclosure relates to an aqueous fluid comprising a thermo-responsive polymer. Once injected into a subterranean formation, through an effect of the geothermal heat of the subterranean formation the fluid comprising the thermo-responsive polymer undergoes in situ a phase transition, becoming a gel of viscosity such as to locally modify the permeability of the formation to fluids. The present disclosure may be used advantageously in the oil industry, particularly in improved oil recovery operations (IOR) or enhanced oil recovery (EOR), to modify the permeability of a subterranean formation to displacement fluids, for example water or gas, that are used in the production of oils and hydrocarbon gases.

BACKGROUND

As is known, in processes of improved recovery of hydrocarbon fluids (oil and gas) from a subterranean formation, the hydrocarbon fluid initially present in the pores of the reservoir rock is brought to the surface by means of displacement by an immiscible fluid (also called a displacement fluid) that takes its place. To this end, wells are drilled within the oil field for the injection of the displacement fluid, generally water, that are arranged in such a way as to create in the subsoil the most uniform possible advancing front to displace the hydrocarbon fluid towards the production well.

The technique of displacement by injections of water (water flooding) has long been the simplest and most economical method used to sustain production in an oil field and increase the overall recovery factor of the hydrocarbon fluid.

The quantity of hydrocarbon fluid that can be displaced towards the production wells by water injection depends, among other factors, on the degree of heterogeneity of the reservoir rock and the properties of the hydrocarbon fluid (above all the viscosity). In particular, fractures, channels or levels of high permeability (the latter also called thief zones) constitute preferential flow pathways. The natural tendency of fluids to flow through the most permeable portions of the reservoir rock means that, with the passage of time, the water injected into the subsoil continues to flow away along these fractures, channels or levels of high permeability, reaching the producer wells directly without or only minimally infiltrating the zones of the reservoir rock in which the hydrocarbon fluid is still present, thus producing no displacement effect.

In these situations, the production of water can increase until it dominates that of the hydrocarbon fluid, thus rendering the production of the latter barely or not at all advantageous from an economic standpoint.

Furthermore, the co-production of water implicates the adoption of specific treatment plants so as to be able to safely dispose of the water produced, or of systems for its re-injection into the subsoil. These measures involve high consumption of energy and materials, and increase the overall cost of hydrocarbon extraction.

In the state of the art, the problem of undesirable production of water and of the inadequate efficiency of the recovery of the hydrocarbons by displacement with water is dealt with by injecting into the subsoil liquid compositions containing chemical compounds that are capable of modifying the permeability characteristics of the subterranean formation. The compounds most in use for this purpose are generally in the form of polymers, gels or foams. These compounds are here also called "blocking agents". The blocking agents block the pores of the formation zones with the highest permeability, diverting the flow of the displacement fluid towards the zones that are still rich in hydrocarbon fluid, thus increasing the production capacity of the well.

US 2009/0264321 describes a method for modifying the permeability of a subterranean formation based on injecting into the subsoil a composition comprising encapsulated expandable polymeric microspheres. Once injected into the subsoil, following an activation event (for example a variation in temperature or pH), the polymeric microspheres escape from the capsules in which they are enclosed and disperse into the formation, where they swell up by absorbing the displacement fluid with which they are in contact. Swelling of the microspheres within the pores of the formation prevents the flow of the displacement fluid, which is thus diverted towards other zones of the formation. However, the properties of the aforesaid encapsulated polymeric microspheres cannot be easily modifiable and therefore optimizable as a function of the specific conditions of the formation. Furthermore, the aforesaid microspheres alter the permeability of the formation irreversibly, so that any errors of injecting the blocking agent are not remediable.

Also known in the state of the art are blocking agents composed of thermo-responsive polymers. Thermo-responsive polymers are polymers that show a drastic and discontinuous change in chemicophysical properties with temperature. The term thermo-responsive is commonly used with reference to the solubility of the polymer in a given solvent. A polymer having a solubility with thermo-responsive characteristics presents a region of immiscibility in the temperature-composition diagram, characterised by at least one phase transition that is reversible in response to a variation in temperature. In general, two different types of phase transition are seen in a solution of a thermo-responsive polymer, each of which is characterised by a specific critical temperature:

in a first type of transition, the polymers that are soluble in a given solvent become insoluble in the same solvent as its temperature rises; the temperature at which this phase transition occurs is called the lower critical solution temperature(LCST);
  in a second type of transition, the polymers that are insoluble in a given solvent become soluble as the temperature rises; the temperature at which this phase transition occurs is called the upper critical solution temperature(UCST);

Further information on thermo-responsive polymers and their solubility properties are given, for example, in *Chem. Soc. Rev.*, 2013, 42, 7214, and *Polymers* 2011, 3, 1215-1242.

US 2012/0264655 describes the use of blocking agents based on thermo-responsive polymers and hydrogels in combination with various treatment fluids for oil extraction operations. The treatment fluids (e.g. drilling fluids, fracturing fluids, etc.) contain a gelling agent formed of a thermo-responsive graft polymer comprising a water-soluble main chain (e.g. Polyacrylic acid) onto which are grafted a plurality of side chains having thermo-responsive functional groups. The polymeric side chains confer on the polymer a characteristic LCST value, determining the course of its solubility as a function of temperature.

WO 1995026455 describes a method for controlling the permeability in a subterranean formation, which comprises injecting an aqueous solution of at least one thermo-responsive polymer into a well up to a zone of the formation having a temperature higher than the temperature of the solution in the well. The thermo-responsive polymer has an LCST temperature intermediate between the temperature of the solution in the well and the temperature of the zone. Through an effect of the temperature increase caused by the heat transmitted from the zone to the solution, the thermo-responsive polymer becomes insoluble, thus altering the permeability of the formation. According to WO1995026455, the LCST temperature of the thermo-responsive polymer may be regulated by advantageous selection of the type of monomers and/or co-monomers, their weight ratios, or by adding further compounds capable of modifying the LCST temperature. The thermo-responsive polymers are prepared by bulk polymerisation or suspension polymerisation. The effects of permeability modification may be rendered reversible, for example by injecting refrigerant liquids into the formation which, by lowering the temperature of the formation to values below the LCST temperature, cause the inverse transition phase of solubilisation of the polymer.

The methods known in the prior art for controlling the permeability of a subterranean formation, that are based on the use of thermo-responsive polymers, have the disadvantage of not allowing adequate controlling of the permeability-modifying effects induced by the transition phase of the polymer at temperatures above the LCST. In particular, the modifications are often irreversible or necessitate further interventions, such as the injection of refrigerant fluids as described in WO 1995026455.

SUMMARY

In consideration of the aforesaid state of the art, the Applicant therefore set the primary objective of providing a fluid for controlling the permeability of a subterranean formation, which at least partially overcomes the drawbacks of the prior art.

Within the scope of this primary objective, the present disclosure provides an aqueous fluid for controlling the permeability of a subterranean formation comprising a thermo-responsive polymer, wherein the LCST temperature at which occurs the transition phase from soluble polymer to viscous gel is easily regulable, and therefore adaptable to the specific conditions of the subterranean formation the permeability of which is to be modified.

The present disclosure also provides a fluid for controlling the permeability of a subterranean formation that is easily injectable into the formation and whose effect of blocking of the pores due to formation of the gel phase is at least partially reversible, preferably without this reversibility being induced by external actions, such as for example the injection of refrigerant fluids.

The present disclosure further provides a fluid for controlling the permeability of a subterranean formation that can be prepared by a simple method at moderate cost.

The Applicant has now found that these and other advantages, which will be better illustrated in the description that follows, can be achieved by means of an aqueous fluid comprising a thermo-responsive polymer having a block structure A-B-A', wherein the outer blocks A and A', the same as or different from one another, are oligomer groups with thermo-responsive characteristics, and therefore having a characteristic and defined LCST, whereas the central block B is a hydrophilic oligomer group of relatively high length.

It has in fact been observed that by synthesising a polymer with the aforementioned A-B-A' block structure, in which the thermo-responsive blocks A and A' are distanced one from the other by a hydrophilic oligomer segment of sufficient length, it is possible to prepare aqueous solutions of said polymers which change state, becoming viscous gels, at a well-defined temperature (LCST). The LCST value of the polymer A-B-A', and therefore the temperature at which the phase transition occurs, may be easily regulated by modifying the composition of the thermo-responsive blocks A and/or A', for example by incorporating hydrophilic and hydrophobic monomers and/or by varying the length of the oligomers A and/or A'.

The aforementioned thermo-responsive A-B-A' polymers are soluble at low temperatures, that is, at a temperature below the LCST, whereas they form a gel phase of relatively high viscosity at high temperatures, that is, at a temperature above the LCST. As a result of this, they can be easily injected into the subterranean formation in the form of aqueous solutions of low viscosity at temperatures below the LCST, whereas they act as blocking agents following phase transition to viscous gel, in the zones in which the temperature of the formation exceeds the LCST.

Without making reference to any particular theory, it is considered that, at temperatures above the LCST, the blocks A of the polymer A-B-A' collapse, forming micellar structures which, being linked to one another via a "bridge" composed of the oligomer block B, give rise to a reticulated structure of relatively high viscosity (physical gel).

Advantageously, the blocks A and A' of the A-B-A' polymers can also include portions that are degradable over time in the temperature conditions of the subterranean formation, for example by effect of a hydrolysis reaction. Degradation of the aforesaid degradable portions leads to a structural modification of the original blocks A and A', with consequent variation of the thermo-responsive behaviour of the polymer. In particular, following the degradation an increase in the LCST of the polymer occurs; when the LCST of the degraded polymer exceeds the temperature of the subterranean formation, the phase transition of the viscous gel into fluid polymeric solution occurs.

Due to the A-B-A' block structure, the polymers according to the present disclosure may be prepared so as to have the LCST more suitable for the specific geothermal profile of the subterranean formation, so increasing the efficacy of the displacement fluids (lower production of water) and consequently the productivity of the fluid hydrocarbons (oil or gas).

In accordance with a first aspect, the present disclosure therefore relates to a fluid for controlling the permeability of a subterranean formation comprising an aqueous solution of at least one thermo-responsive polymer with an A-B-A' block structure, wherein:

A and A', the same as or different from one another, each represent a thermo-responsive oligomer group;

B is an oligomer group comprising n repeat units, the same as or different from one another, wherein:

(i) at least one of the repeat units has a solubility of the corresponding monomer, in water at 20° C., equal to or greater than 120 g/L, (ii) n is a whole number within the range 30-1000.

In accordance with a second aspect, the present disclosure relates to a method for controlling the permeability of a subterranean formation comprising:

a. providing a fluid comprising an aqueous solution of at least one thermo-responsive polymer with block structure A-B-A', wherein:

A and A', the same as or different from one another, each represent a thermo-responsive oligomer group;

B is an oligomer group comprising n repeat units, the same as or different from one another, wherein:
(i) at least one of the repeat units has a solubility of the corresponding monomer, in water at 20° C., equal to or greater than 120 g/l,
(ii) n is a whole number within the range 30-1000;
b. positioning said treatment fluid in a subterranean formation.

In accordance with a third aspect, the present disclosure relates to the use of the aforesaid fluid to modify the permeability of a subterranean formation.

In accordance with a further aspect, the present disclosure relates to the use of the aforesaid fluid to limit the infiltration of water into a well for extracting an oil or hydrocarbon gas from a subterranean formation.

For the purposes of the present description and of the claims, the lower critical solubility temperature (LCST) of a polymer is to be understood as determined by the turbidimetric method described in the examples.

For the purposes of the present description and of the claims, the "degree of polymerisation" of a polymer, also denoted as DP (degree of polymerisation), is the mean number of repeat units present in a polymer, determined by $^1$H NMR spectroscopy with methods known to the person skilled in the art, on a solution of the polymer in $CDCl_3$ as the solvent (99.8% D atoms) at a polymer concentration of 15 mg/mL.

For the purposes of the present description and of the claims, the terms "oligomer" and "polymer" include the terms homopolymer and co-polymer, unless explicitly indicated otherwise or in any event unless otherwise deducible from the text. The oligomers and the polymers, that is, can be formed from the same repeat unit or from two or more repeat units different from each other. As used herein, the term polymer includes oligomers and polymers.

For the purposes of the present disclosure, the mean molecular weight in number $M_n$ of an oligomer or polymer is understood to be determined by gel permeation chromatography (GPC), using polystyrene as the standard.

For the purposes of the present disclosure, "repeat unit" is understood to mean the constitutive unit of a polymer or an oligomer; said constitutive unit may correspond to one monomer or to two or more monomers, from which it derives following polymerisation; said monomer or monomers from which the repeat unit derives are here also denoted as "corresponding monomer" of the repeat unit.

Further information about the structure of oligomers and polymers can be found, for example, in Alfred Rudin, Phillip Choi, "The Elements of Polymer Science and Engineering", 3rd edition, Elsevier, 2013.

The limits and the numerical intervals expressed in the present description and in the claims also include the numerical value or numerical values mentioned. Furthermore, all the values and sub-intervals of a limit or numerical interval must be understood as specifically included as if they were explicitly mentioned.

BRIEF DESCRIPTION OF THE DRAWINGS

For a better understanding of the features of the present disclosure, in the description reference will be made to the following drawings.

DETAILED DESCRIPTION OF THE DRAWINGS

The block A or A' of the polymer A-B-A' may be formed of an oligomer comprising a single type of repeat units or two or more repeat units different from each other. The blocks A and A' may be the same as or different from one another.

The oligomer group A and/or A' preferably has a lower critical solubility temperature (LCST) within the range 30° C.-100° C., more preferably within the range 40° C.-80° C.

To have thermo-responsive characteristics, the oligomer that forms the block A and/or A' preferably comprises at least one hydrophilic portion and at least one hydrophobic portion.

The hydrophilic portion is preferably formed of polyoxyethylene chains, polylactide chains, $C_2$-$C_{10}$ alkyl chains, linear or branched, containing amide groups.

The hydrophobic portion is preferably obtained from monomers comprising at least one ester or amide group, such as, for example, the compounds (meth)acrylate and (meth)acrylamide.

In a preferred embodiment, the thermo-responsive block A and/or A' is a graft polymer comprising a poly(meth)acrylic or poly(meth)acrylamide linear main chain and a plurality of side chains, connected to said main chain, selected from: poly(ethylene glycol) —[—$CH_2$—$CH_2$—O]$_m$—H, poly(ethylene glycol) methyl ether —[—$CH_2$—$CH_2$—O]$_m$—$CH_3$, HEMA-polylactide —CO—O—$CH_2$—$CH_2$—O—[—CO—$(CH_3)$CH—O]$_m$—H, alkylamide, linear or branched, and combinations thereof, where m is an integer number within the range 2-10.

In an embodiment, the A block and/or A' block is an oligomer containing a plurality of polymer side chains.

In an embodiment, the B block is a linear oligomer that contains no polymer side chains.

In a preferred embodiment, the thermo-responsive blocks A and/or A' are preferably oligomer groups formed of one or more repeat units deriving from monomers selected from: (meth)acrylic acid, oligo(ethylene glycol) methyl ether methacrylate (OEGMA), [2-(methacryloyloxy)ethyl]-trimethylammonium chloride (MADQUAT), HEMA-polylactide, potassium 3-sulfopropyl methacrylate, 2-acrylamido-2-methylpropanesulfonic acid, polymerisable esters comprising polyoxyethylene chains —[—$CH_2$—$CH_2$—O]$_x$—H where x is an integer number within the range 10-1000, N-isopropylacrylamide, N,N-dimethylaminoethyl methacrylate, dimethylacrylamide.

Preferably, the OEGMA compound used to form the block A and/or A' has a mean molecular weight $M_n$ within the range 100-10,000 Dalton, more preferably within the range 100-5,000 Dalton.

In a preferred embodiment, the thermo-responsive block A and/or A' is preferably a co-polymer of two or more OEGMAs having a different molecular weight from one another, for example OEGMAs that differ from one another in the length of the side chains.

In a preferred embodiment, the thermo-responsive block A and/or A' is preferably a co-polymer comprising OEGMA as a first co-polymer and at least one second hydrophobic co-monomer selected from: $C_1$-$C_4$ alkyl-(meth)acrylate (e.g. MMA or BA), (dimethylamino)ethyl methacrylate (DMAEMA) and combinations thereof.

In one embodiment of the present disclosure, the hydrophobic co-monomer selected is a vinyl oligoester that is biodegradable using hydrolysis reactions, such as for example HEMA-polylactide.

By appropriately selecting the type of hydrophilic and hydrophobic units, their molecular weight and the relative molar ratio, it is possible to regulate the LCST value of the A or A' unit and therefore also the behaviour of the final polymer A-B-A' in response to variations of temperature.

Preferably the degree of polymerisation DP of the polymer that forms the blocks A and A', that is, the total number of repeat units present in the blocks A and A', is within the range 2-1000, preferably 3-500, more preferably 5-450, even more preferably 6-400.

The block B of the polymer A-B-A' is an oligomer formed of a single type of repeat units or (homopolymer) or of two or more different types of repeat units (copolymer).

Preferably, the oligomer group that forms the block B comprises one or more repeat units corresponding to monomers selected from: (meth)acrylic acid, polymerisable esters comprising polyoxyethylene chains —[—$CH_2$—$CH_2$—O]$_r$—H where r is an integer number within the range 10-500, more preferably 20-300, oligo(ethylene glycol)methyl ether methacrylate (OEGMA), [2-(methacryloyloxy)ethyl]-trimethylammonium chloride (MADQUAT), potassium 3-sulfopropyl methacrylate, 2-acrylamido-2-methylpropanesulfonic acid, (meth)acrylamide 2-hydroxypropyl methacrylamide, glycerol monomethacrylate, 2-hydroxyethyl methacrylate, methacryloyloxyethyl phosphorylcholine, carboxybetaine, sulfobetaine and combinations thereof.

In an alternative embodiment, the oligomer group that forms the block B is a poly(ethylene glycol) chain (PEG, HO—[$CH_2CH_2$—O]$_n$—H), where n is a whole number comprised between 30 and 300, preferably functionalised at both ends with the CTA of RAFT polymerisation to obtain a macromolecule of the type CTA-PEG-CTA which enables the symmetrical structure A-B-A to be obtained in a single polymerisation stage.

Preferably the overall degree of polymerisation DP of the block B, that is, the total number of repeat units, the same as or different from one another, present in the block B, is within the range 10-1000, preferably 20-500, more preferably 50-500.

In one embodiment, the block B possesses no thermal response characteristic.

In another embodiment, the block B does possess thermal response characteristics, but these do not substantially alter the thermal response properties of the polymer A-B-A'. For example, the block B may be a thermo-responsive polymer having an LCST temperature higher than the LCST temperature of the blocks A and A'. Therefore this polymer has no influence on the thermal response behaviour of the polymer A-B-A', in that the phase transition to viscous gel occurs at the LCST of the blocks A and A', which is lower than that of the block B.

In an embodiment, in the block copolymer A-B-A':
the B block comprises poly(ethylene glycol) (PEG) in the main chain having a mean molecular weight $M_n$ within the range 500-10,000 Dalton, more preferably within the range 1,000-5,000 Dalton;
the A block and/or A' block are oligomer groups comprising, as corresponding monomer, oligo(ethylene glycol)methyl ether methacrylate (OEGMA), preferably having a mean molecular weight $M_n$ within the range 100-1,000.

In another embodiment, in the block copolymer A-B-A':
the B block is an oligomer group comprising, as corresponding monomer, [2-(methacryloyloxy)ethyl]-trimethylammonium chloride (MADQUAT),
the A block and/or A' block are oligomer groups comprising, as corresponding monomer, OEGMA having a mean molecular weight $M_n$ within the range 100-1,000.

In a further preferred embodiment, the oligomer that forms the block A and/or A' comprises one or more degradable repeat units, that is, containing weak bonds capable of progressively breaking over time in the conditions of the region of the subterranean formation in which the polymer A-B-A' is present in the form of a gel. Examples of these degradable units are the monomers used in the state of the art for the synthesis of biodegradable polymers.

For example, in a preferred embodiment, one biodegradable unit utilisable for the purposes of the present disclosure is the macromonomer HEMA-poly(lactide), obtainable for example by ring opening polymerisation (ROP) of the lactide cyclic ester with hydroxyethyl methacrylate (HEMA). This polymerisation reaction is illustrated schematically in the figure below:

HEMA  Lactide

HEMA-LA$_{2n}$

Biodegradable comb polymer with n preferably comprised between 1 and 10 and x preferably comprised between 10 and 500.

The polymerisation of the HEMA-lactide macromonomer in the block A and/or A' leads to the introduction into these blocks of side chains composed of oligoesters, that are degradable by effect of hydrolysis of the ester bonds. The time necessary for the degradation is determined principally by the length of the chain of oligoesters and can be regulated by appropriate selection of the HEMA/lactide ratio during the synthesis of the macromonomer.

Preferably, the HEMA/lactide molar ratio is within the range 1-10.

When the polymer A-B-A' is present in the subterranean formation in the form of a gel, following degradation of the oligoester chains, a progressive increase in the hydrophilic properties of the polymer A-B-A' and, consequently, of its LCST is observed. When the LCST of the polymer exceeds the temperature of the formation in which the gel is found, the latter undergoes a change in state, transitioning from gel to soluble polymer and forming a fluid aqueous phase, which can then once again move through the formation.

Moreover, it will be noted that, in the case of the HEMA-lactide, the product of degradation of the oligoester chains is composed principally of molecules of lactic acid, a biocompatible substance.

In a preferred embodiment, block B comprises at least one cation functionality. This cation functionality may be introduced by preparing the polymer B from monomers comprising cation functionalities. The following are examples of these monomers: [2-(methacryloyloxy)ethyl]-trimethylammonium chloride (MADQUAT), 2-(dimethylamino)ethyl methacrylate (DMAEMA), 2-aminoethyl methacrylate hydrochloride.

When block B comprises cation functionalities, the gel that is formed from the soluble polymer A-B-A' is capable of interacting more effectively with the surface of the pores of the subterranean formation, establishing electrostatic interactions with the carbonate rocks of the formation, which render the blocking action of the gel more effective.

The triblock A-B-A' polymers according to the present disclosure may be prepared with the polymerisation techniques known in the state of the art, such as free-radical polymerization (FRP) and controlled radical polymerization (CRP). CRP techniques comprise, for example: atom transfer radical polymerization (ATRP), nitroxide mediated polymerization (NMP) and reversible addition-fragmentation transfer polymerization (RAFT).

In particular, for the preparation of thermo-responsive block polymers according to the present disclosure, CRP techniques of controlled polymerisation are preferred, which yield polymer chains of homogeneous length and therefore having a similar thermal response behaviour. The homogeneity of the length of the polymer chains guarantees the obtaining of A-B-A' polymers having a well-defined and predeterminable LCST. Among the CRP techniques, the one especially preferred is the RAFT polymerisation technique. As is known, RAFT polymerisation is a process of degenerative transfer polymerisation, in which a chain-transfer agent is added to the starting monomers with the aim of transferring, during polymerisation, the radical function from one polymer chain to another extremely rapidly, thus enabling uniform growth of the polymer chains. Transfer of the radical function occurs by interaction between the terminal portion of the chain-transfer agent (CTA) and the active radical chain, which brings the latter to a dormant state while rendering the chain previously bound to the CTA agent active again.

On account of the above-mentioned mechanism, RAFT polymerisation is especially suitable for the preparation of block copolymers and represents the ideal solution in the production of thermo-responsive materials having well-defined and predeterminable LCSTs.

With RAFT polymerisation it is also possible to prepare polymers having polymer chains of well-defined length, as well as being mutually homogeneous. The length of a polymer chain is here expressed by the marker "DP", previously defined.

In RAFT polymerisation, the DP of the polymer can be regulated simply, selecting the ratio of the initial monomer concentration to that of the CTA in the polymerisation mixture.

In general, the A-B-A' polymers according to the present disclosure may be prepared by RAFT polymerisation in successive steps, as described by way of example hereinafter.

In a first step, the synthesis of block A is performed, by polymerising for example OEGMA300 (that is, oligo(ethylene glycol) methyl ether methacrylate, Mn=300) to obtain poly[OEGMA300$_{500}$], where the marker DP=500 indicates the degree of polymerisation, that is, the average number of OEGMA300 repeat units present in the block A oligomer. To this end, the OEGMA300 monomer is set to react with a CTA, for example 4-cyano-4-(phenylcarbonothioylthio) pentanoic acid, and a polymerisation initiator, for example 4,4'-azobis(cyanovaleric) acid (ACVA), in a polar solvent (e.g. ethanol), at a temperature of approximately 50-80° C., at atmospheric pressure, for 24-48 hours. The relative quantities of reagents may be calculated in such a way as to determine the desired DP.

Following evaporation of the solvent and recovery of the unreacted monomer (for example, by extraction with diethyl ether), the oligomer that forms block A can be recovered in the form of a viscous liquid.

The oligomer that forms block A has polymer chains terminating on both sides by the specific functionalities of the CTA used in the first step. This therefore represents a macro-CTA that may be set to react with the monomer of segment B, in a second step of RAFT polymerisation. In this second step, the monomer of block B acts essentially as a block A chain extender. Block B, for example, may be formed by using OEGMA2000 (that is, oligo(ethylene glycol) methyl ether methacrylate, Mn=2,000) as the monomer, to obtain poly[OEGMA2000$_{500}$], with DP=500. The RAFT polymerisation of the second step may be performed under conditions similar to those of the first step. At the end of the second step, a diblock polymer A-B of the type poly[OEGMA300$_{500}$-OEGMA2000$_{500}$] is therefore obtained. This polymer too, because it contains chains terminated on both sides by the CTA functionalities, may be used as a macro-CTA in a third step of RAFT polymerisation to add the block A' to the diblock polymer A-B and obtain the triblock polymer A-B-A'. To this end, the polymer poly

[OEGMA300$_{500}$-OEGMA2000$_{500}$] is set to react, for example, with the same monomer used to form the segment A in the first step in the presence of the initiator ACVA in conditions analogous to those of the first step, thus obtaining the A-B-A symmetrical polymer poly[OEGMA300$_{500}$-OEGMA2000$_{500}$-OEGMA300$_{500}$]. However, if a monomer A' different from A is used, an asymmetrical polymer A-B-A' is obtained.

The symmetrical polymers A-B-A, that is where A is equal to A', may be prepared by RAFT polymerisation also via a two-step process. In the first step, the repeat unit (or repeat units) that forms the oligomer B (which may have been synthesised via RAFT or another polymerisation technique) is reacted with a CTA compound, the latter being present in the reaction mixture in a quantity such as to obtain the oligomer B terminating on both sides by the specific functionalities of the CTA used (macro-CTA), for example in a molar ratio with respect to the oligomer B greater than or equal to 2, preferably comprised between 2.1 and 4. In the second step, the repeat unit (or repeat units) that is to form the oligomer A is made to polymerise in the presence of the macro-CTA produced in the first step to obtain the final symmetrical polymer A-B-A.

According to an alternative synthesis route, the symmetrical polymers A-B-A may be prepared by synthesising, in a first step, the oligomer blocks A by RAFT polymerisation in the presence of a bifunctional CTA (to obtain A-CTA-A). In a second step, the oligomer A-CTA-A is reacted with the repeat unit that forms the block B, so as to extend the chain of the oligomer A-CTA-A starting from the central unit until the polymer A-B-A is obtained.

For the purposes of the present disclosure, the thermo-responsive A-B-A polymers are introduced into the subterranean formation, the permeability of which to fluids in the form of aqueous fluid is to be modified. Preferably, the treatment fluid comprises the A-B-A' polymers in the form of aqueous solution. The concentration of the polymer in the aqueous solution is preferably within the range 0.5-40% by weight, more preferably within the range from 1 to 20% by weight, with respect to the weight of the aqueous solution.

The aqueous fluid comprising the A-B-A' polymer may be used for controlling the permeability of a subterranean formation during oil extraction activity.

For the purposes of the present disclosure, subterranean formation is intended to mean a zone beneath the land surface, including the surfaces of the seabed. For example, a subterranean formation may be any zone of a formation containing a rock storing a hydrocarbon fluid (oil or gas) and any zone of a well in fluid communication with said formation.

The method for controlling the permeability to fluids of a subterranean formation according to the present disclosure may be applied both before starting extraction of the hydrocarbon fluid from the subterranean formation and when the extraction well is already in production.

The method according to the present disclosure may be advantageously applied to the extraction wells termed "mature", that is, to wells that have now reached the limit of their production capacity and are characterised by the extraction of significant quantities of water in association with the oil or hydrocarbon gas.

The positioning of the fluid for controlling permeability in a subterranean formation may be carried out with the equipment and according to the techniques known in the oil extraction industry.

The positioning may, for example, be done by injecting the control fluid both via the well for extracting the hydrocarbon fluid and through the other wells generally present in an oil field, such as the wells for injecting steam, water or other displacement fluids into the subsoil (known as injection wells).

On the basis of the criteria and using the preparation methods disclosed above, the person skilled in the art can select the control fluid comprising the polymer A-B-A' in such a way that said polymer has an LCST higher than the injection temperature of the fluid and lower than the temperature of the deposits within the zone in which the permeability control is to be carried out.

The method according to the present disclosure may be used within the scope of secondary and tertiary activities for recovery of a hydrocarbon oil, both in water-blocking interventions (water shut-off treatment) and in treatments conforming the subterranean formation (conformation treatment).

The quantities of aqueous fluid comprising the thermo-responsive polymers to be injected into the subterranean formation can vary widely as a function of its specific geological conformation. The quantities may be easily determined by the person skilled in the art on the basis of the geological characteristics of the formation and of simple routine experiments.

The following example embodiments are provided merely in order to illustrate the present disclosure and are not to be understood in a sense limiting the scope of protection defined by the claims.

EXAMPLES

1. Determination of the LCST

For the purposes of the present disclosure, the lower critical solubility temperature (LCST) of a polymer is intended to be determined by the turbidimetry method, by measuring the optical transmittance of an aqueous solution 0.2% by weight of the polymer under investigation, at ambient pressure. The transmittance measurements are conducted on the sample maintained at different temperatures. By plotting the percentage transmittance recorded against the corresponding temperature of the sample, a sigmoidal curve is obtained. The temperature at the inflection point of the curve is considered the LCST of the polymer.

2. Preparation of the Thermo-Responsive Polymers 2.1 Polymer 1

A thermo-responsive polymer having the following A-B-A block structure was prepared as follows.

thermo-responsive biodegradable block     hydrophilic PEG internal block     thermo-responsive biodegradable block Step 1—Preparation of the Macro-CTA "CTA-B-CTA"

A hydrophilic and bifunctional macro-CTA was synthesised by Steglich esterification between an equivalent of poly(ethylene glycol) (PEG) HO—[CH$_2$—CH$_2$]$_n$—OH (Mn=4000 g·mol$^{-1}$) and two equivalents of 4-phenyl(carbonothioylthio) pentanoic acid (CPA). To this end, 50 g PEG and 7.7 g CPA were solubilised in 300 mL dichloromethane (DCM). The solution obtained was loaded into a round-bottomed flask immersed in an ice and water bath. Separately, 5.7 g dicyclohexylcarbodiimide (DCC) and 0.27 g 4-dimethylamino pyridine (DMAP) were solubilised in 25 mL DCM. The solution obtained was added dropwise to the one containing PEG and CPA, maintained under magnetic stirring, within an hour. The mixture thus obtained was left to equilibrate at ambient temperature, and then reacted for 18 hours. After concentrating under vacuum to reduce the volume to about half, the product was recovered by precipitation of the reaction mixture in diethyl ether and left to dry in an oven under vacuum at 35° C.

The resulting macro-CTA is a hydrophilic polymer that exhibits no thermal response behaviour.

Step 2—Preparation of the A-B-A Polymer

The macro-CTA obtained in step 1 was used in the RAFT polymerisation of OEGMA300 and of HEMA-lactide to obtain the A-B-A block structure (Polymer 1). To this end, 2.59 g OEGMA300, 2.41 g HEMA-lactide, 0.065 g of the macro-CTA in step 1 and 1 mg azobiscyanovaleric acid (ACVA) were dissolved in 25 mL ethanol. The solution was bubbled with nitrogen for 30 minutes, keeping it in an ice and water bath. The RAFT polymerisation was then conducted at 65° C. for 24 hours. The polymer was subsequently recovered by precipitation from the reaction mixture in diethyl ether, followed by drying in an oven under vacuum at 35° C.

The DP of the external A blocks was found to be 500.

The LCST temperature of the Polymer 1 was found to be 45° C.

2.2 Polymer 2

A thermo-responsive polymer having the following A-B-A block structure was prepared as follows.

thermo-responsive biodegradable block    internal cationic block    thermo-responsive biodegradable block Step 1—Preparation of the "CTA-A" Macro-CTA The first thermo-responsive A block was synthesised by dissolving 13 g OEGMA300, 12 g HEMA-lactide, 40 mg CPA and 10 mg ACVA in 130 mL ethanol. The solution was bubbled with nitrogen for 30 minutes and then reacted at 65° C. for 24 hours. The polymer was precipitated in diethyl ether and its DP was evaluated as 500. By GPC analysis it was determined that the mean molecular weight of the product was approximately 188000 g·mol$^{-1}$, with polydispersity of 1.19.

Step 2—Preparation of the "CTA-B-A" Macro-CTA

The macro-CTA 1 obtained in step 1 was used in a second RAFT stage to bind the hydrophilic B block. Specifically, 10 g of macro CTA, 2.4 g MADQUAT and 5 mg ACVA were solubilised in 50 mL of a 50:50 v/v water:ethanol mixture. The solution was bubbled with nitrogen for 30 minutes while keeping it in an ice and water bath, and then left to react at 65° C. for 24 hours. The A-B block polymer (macro-CTA 2) was then precipitated in diethyl ether and recovered by filtration under vacuum. The DP calculated for the B block B was found to be 200.

Step 3—Preparation of the A-B-A Polymer

Finally, in the third RAFT stage, the A-B-A triblock copolymer was obtained by extending the macro-CTA 2 obtained in the previous step 2 with OEGMA300 and HEMA-lactide. To this end, 10 g of macro-CTA 2, 4.2 g OEMA300, 3.88 g HEMA-lactide and 3 mg ACVA were dissolved in 80 mL of a 50:50 v/v water:ethanol mixture. The reactive mixture was bubbled with nitrogen for 30 minutes, keeping it in an ice and water bath, and then reacted at 65° C. for 24 hours. The A-B-A block polymer was then precipitated in diethyl ether and recovered by filtration under vacuum. The DP of the third block (A) was found to be 500.

The LCST temperature of the Polymer 2 is 45° C.

3. Thermo-Responsive Solubility

The phase transition of the thermo-responsive polymers 1 and 2 from aqueous polymer solution to viscous gel was verified experimentally, conditioning a test tube containing a sample of aqueous solution of the polymer (30% by weight of polymer with respect to the weight of the solution) at a temperature of 55° C. for 30 minutes.

In both cases, at the end of the conditioning, the formation of a viscous gel at the bottom of the test tube was observed. By conditioning the test tube containing the gel again at ambient temperature (25° C.) the inverse transition from gel to aqueous polymer solution was observed.

4.1 Permeability Modification Tests on Packed Sand

The effectiveness of an aqueous fluid containing the Polymer 1 according to the present disclosure in controlling the permeability of a sample of packed sand was verified experimentally in the following way.

A solution of Polymer 1 (1% by weight) in saltwater was prepared using a synthetic saltwater having the composition given in Table 1 below (density at 70° C.=0.9465 kg/L; viscosity at 70° C.=0.4058 cP).

TABLE 1

| saltwater composition | |
|---|---|
| Compound | Concentration (g/L) |
| NaCl | 22 |
| $MgCl_2$ ($6H_2O$) | 9.7 |
| $Na_2SO_4$ (anhydrous) | 37 |
| $CaCl_2$ (anhydrous) | 1 |
| KCl | 0.65 |
| $NaHCO_3$ | 0.2 |
| $H_3BO_4$ | 0.023 |
| Total | 37.273 |

On a sample (cylindrical core) of packed sand (passed through a 20-mesh and a 40-mesh sieve) 14.50 cm in length and 5.10 cm in diameter, measurements of permeability to fluids were made using the solution of the Polymer 1 and the saltwater of Table 1 (without thermo-responsive polymer), as the reference fluid.

The cylindrical core, housed in a sample holder, was placed inside a temperature-controlled oven. The measurement system included, in addition to the aforesaid oven, a system of pumps for injecting the fluids into the core at preset flow rate values, and devices for measuring the flow rates of the fluids. A containment overpressure (nitrogen) of 50 bar was applied to the core (on top of the internal pressure) to avoid the effects linked to the compressibility of the sand during injection of the fluids. During fluxing of the fluids in the sample, the load losses between inflow and outflow of the fluid from the sample were measured by means of electronic transducers.

Initially, the permeability of the sample was measured by flushing the reference fluid comprising the saltwater. The treatment fluid comprising the solution containing Polymer 1 was then injected, up to saturation of the core. The core was then maintained at a temperature of 70° C. for the time necessary for the phase transition to occur, from soluble polymer to gel capable of opposing resistance to the flow of the injected fluid. In a final step, saltwater was again injected into the core to determine the variation in its permeability following the treatment with the solution of Polymer 1.

The permeability of the sample was determined by measuring the load losses in response to variation in the flow rate of the injected fluid.

The resistance factor $F_r$ gives an indication of the relative mobility of the aqueous solution of Polymer 1 within the sample with respect to the mobility of the saltwater alone in the same sample.

The residual resistance factor $F_{rr}$ instead provides a measure of the reduction in relative mobility of the reference fluid in the sample following treatment of the sample with the treatment fluid, with respect to the mobility of the same reference fluid prior to the treatment of the sample with the treatment fluid. Higher values of the parameters $F_r$ and $F_{rr}$ indicate a higher resistance of the sample to passage of a fluid.

During fluxing of the solution of Polymer 1 in the core at ambient temperature, the value of $F_r$ was found to be equal to approximately 1.15. This value, being low, indicates that the solution of Polymer 1 is easily injectable into the sample.

The saturated sample of solution of Polymer 1 was maintained at a temperature of 70° C. for 48 hours and then flushed with saltwater to verify the extent of modification of permeability. The value of $F_{rr}$ determined for the saltwater flushing was 22.7. The treatment with Polymer 1 thus determined a reduction in the permeability of the saltwater by a factor of approximately 23.

4.2 Tests of Modification of the Permeability on Sandstone—Clashach

The test described in the preceding point 4.1 was repeated on a cylindrical core of sandstone of Clashach type, length 14.50 cm and diameter 5.10 cm, using the solution of Polymer 1 and the reference saltwater described above.

During fluxing of the solution of Polymer 1 in the core at ambient temperature, the value of $F_r$ was found to be approximately 10.6. This value indicates a resistance to the injection of acceptable magnitude.

The value of $F_{rr}$ determined for the fluxing of saltwater was 142.8. This value of $F_{rr}$ confirms the efficacy of the treatment for controlling the permeability of the sample with the polymers according to the present disclosure.

5. Test of Deterioration

To verify the reversibility of the sol-gel transition following hydrolysis of the ester bonds, Polymer 2 inside a container was conditioned at a temperature of 55° C. for 30 minutes, so as to enable formation of the gel. A head of saltwater was then added on top of the gel layer. Change in the biphasic system, maintained at 55° C., was monitored by measuring the loss of mass by thermogravimetry and the pH of the head of water.

Figure 1:
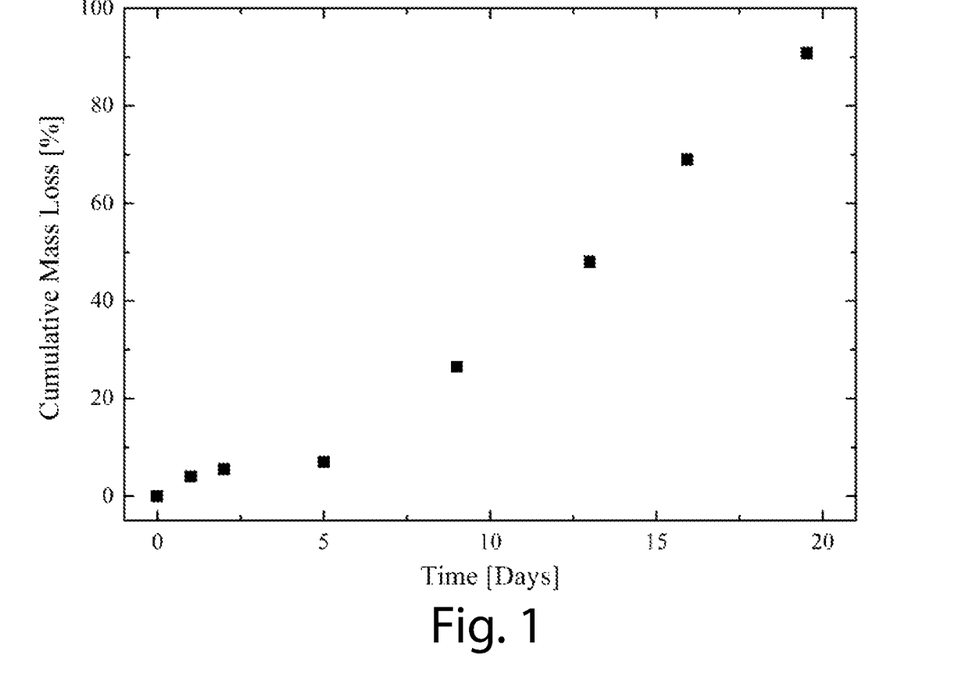
FIG. 1 (degradation test): graph of the percentage loss of mass of Polymer 1 (with respect to the initial weight of the sample) as a function of the observation time.
Figure 2:
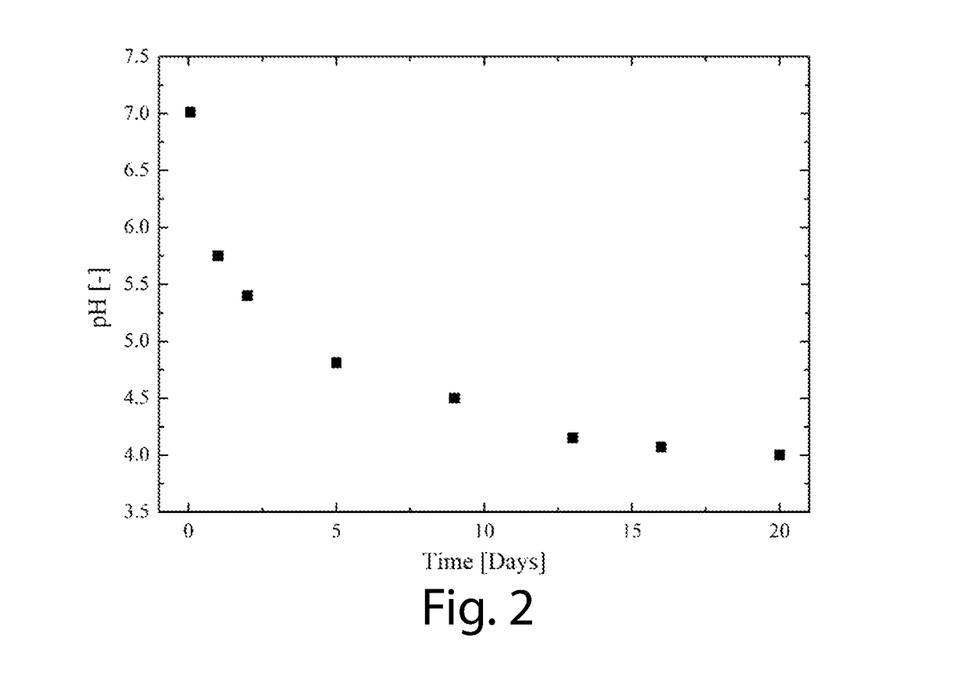
FIG. 2 (degradation test): graph of the pH value of the liquid phase as a function of the observation time.

FIGS. 1 and 2 give the experimental values for loss of mass and pH of the biphasic system observed as a function of time.

FIG. 1 shows that, after an induction period of around 7 days in duration, in which only a slight decline (less than 10%) in the mass of the gel was recorded, the mass of the gel began to fall off linearly over time, until, after 20 days, it resulted in the solubilisation of the gel in the head of water, and therefore in its total disappearance. In parallel, as shown by FIG. 2, the pH of the liquid phase declined over time. The reduction in the pH can be attributed to the release of acid species, in particular lactic acid, which accompanies degradation of the polymer.

The invention claimed is:

1. A fluid for controlling the permeability of a subterranean formation comprising a blocking agent formed of an aqueous solution of at least one thermo-responsive polymer of block structure A-B-A', wherein:
A and A', the same as or different from one another, each represent a thermo-responsive oligomer group;
B is an oligomer group comprising n repeat units, the same as or different from one another, wherein:
(i) at least one of the repeat units has a solubility of the corresponding monomer, in water at 20° C., equal to or greater than 120 g/l,
(ii) n is a whole number within the range 30-1000,
wherein outer blocks A and A' are selected from the group consisting of:
(a) oligomer groups formed by two or more oligo (ethylene glycol) methyl ether methacrylate (OEGMA) compounds having molecular weight different from one another, wherein said OEGMA compound has a mean molecular weight (Mn) within the range 100-10,000 Dalton (0.1 kg/mol-10 kg/mol); and
(b) a co-polymer formed by OEGMA as a first co-monomer and by hydroxyethylmethacrylate (HEMA)-polylactide as a second comonomer;
and wherein
the block B is selected from the group consisting of:
(c) poly (ethylene glycol) chain (PEG, HO-[CH$_2$CH$_2$-O] $_n$-H), where n is a whole number comprised between 30 and 300; and
(d) an oligomer group formed by one or more repeat units selected from:
(meth) acrylic acid, polymerisable esters comprising polyoxyethylene chains-[-CH$_2$-CH$_2$-O]$_r$-H where r is an integer number within the range 10-500, potassium 3-sulfopropyl methacrylate, 2-acrylamido-2-methylpropanesulfonic acid, (meth) acrylamide, 2-hydroxypropyl methacrylamide, glycerol monomethacrylate, methacryloyloxyethyl phosphorylcholine, carboxybetaine, sulfobetaine and combinations thereof, and
wherein said A block and/or said A' block has a lower critical solubility temperature (LCST) within the range 40° C.-100° C.

2. The fluid according to claim 1, wherein said A block and/or A' block is an oligomer containing a plurality of polymer side chains.

3. The fluid according to claim 1, wherein said B block is a linear oligomer that contains no polymer side chains.

4. The fluid according to claim 1, wherein said A block and/or said A' block has a lower critical solubility temperature (LCST) within the range 40° C.-80° C.

5. The fluid according to claim 1, wherein said A block and/or said A' block have a degree of polymerisation DP within the range 2-1,000.

6. The fluid according to claim 1, wherein:
said B block comprises poly (ethylene glycol) (PEG) in the main chain having a mean molecular weight Mn within the range 500-10,000 Dalton;
said A block and/or A' block are oligomer groups comprising, as corresponding monomer, oligo (ethylene glycol) methyl ether methacrylate (OEGMA).

7. The fluid according to claim 1, wherein:
said A block and/or A' block are oligomer groups comprising, as corresponding monomer, OEGMA having a mean molecular weight Mn within the range 100-1,000.

8. The fluid according to claim 1, wherein said B block comprises at least one cationic pendant group.

9. The fluid according to claim 1, wherein said at least one thermo-responsive polymer of block structure A-B-A' is present in said aqueous solution in a concentration within the range 1-20% by weight, with respect to the weight of the aqueous solution.

10. The fluid according to claim 9, wherein the block B is selected from the group consisting of:
(c) poly (ethylene glycol) chain (PEG, HO-[CH$_2$CH$_2$-O] $_n$-H), where n is a whole number comprised between 30 and 300; and
(d) an oligomer group comprising one or more repeat units selected from:
(meth) acrylic acid, polymerisable esters comprising polyoxyethylene chains-[-CH$_2$-CH$_2$-O] $_r$-H where r is an integer number within the range 10-500, potassium 3-sulfopropyl methacrylate, (meth) acrylamide, 2-hydroxypropyl methacrylamide, glycerol monomethacrylate, methacryloyloxyethyl phosphorylcholine, carboxybetaine, sulfobetaine and combinations thereof.

11. A method for controlling the permeability of a subterranean formation comprising:
a. providing the fluid according to claim 1; and
b. positioning said treatment fluid in a subterranean formation.

12. The method according to claim 11, wherein said polymer A-B-A' is present in said aqueous solution in a concentration within the range 1-20% by weight, with respect to the weight of the aqueous solution.

13. The method according to claim 11, wherein said step b comprises injecting said fluid via at least one extraction well and/or at least one injection well.

14. A fluid for controlling the permeability of a subterranean formation comprising a blocking agent formed of an aqueous solution of at least one thermo-responsive polymer of block structure A-B-A', wherein:
A and A', the same as or different from one another, each represent a thermo-responsive oligomer group;
B is an oligomer group comprising n repeat units, the same as or different from one another, wherein:
(i) at least one of the repeat units has a solubility of the corresponding monomer, in water at 20° C., equal to or greater than 120 g/l,
(ii) n is a whole number within the range 30-1000,
wherein outer blocks A and A' blocks are selected from the group consisting of:
(a) oligomer groups formed by two or more oligo (ethylene glycol) methyl ether methacrylate (OEGMA) compounds having molecular weight different from one another, wherein said OEGMA compound has a mean molecular weight (Mn) within the range 100-10,000 Dalton (0.1 kg/mol-10 kg/mol); and (b) a co-polymer formed by OEGMA as a first co-monomer and by hydroxyethylmethacrylate (HEMA)-polylactide as a second comonomer;

and wherein the block B is selected from the group consisting of:

(c) poly (ethylene glycol) chain (PEG, HO-[CH$_2$CH$_2$-O]$_n$-H), where n is a whole number comprised between 30 and 300; and (d) an oligomer group formed by one or more repeat units selected from:

(meth) acrylic acid, polymerisable esters comprising polyoxyethylene chains-[-CH$_2$-CH$_2$-O]$_r$-H where r is an integer number within the range 10-500, potassium 3-sulfopropyl methacrylate, 2-acrylamido-2-methylpropanesulfonic acid, (meth) acrylamide, 2-hydroxypropyl methacrylamide, glycerol monomethacrylate, methacryloyloxyethyl phosphorylcholine, carboxybetaine, sulfobetaine and combinations thereof, and wherein said at least one thermo-responsive polymer of block structure A-B-A' is present in said aqueous solution in a concentration within the range 1-20% by weight, with respect to the weight of the aqueous solution.

15. A fluid for controlling the permeability of a subterranean formation comprising a blocking agent formed of an aqueous solution of at least one thermo-responsive polymer of block structure A-B-A', wherein:

A and A', the same as or different from one another, each represent a thermo-responsive oligomer group;

B is an oligomer group comprising n repeat units, the same as or different from one another, wherein:

(i) at least one of the repeat units has a solubility of the corresponding monomer, in water at 20° C., equal to or greater than 120 g/l, (ii) n is a whole number within the range 30-1000, wherein outer blocks A and A' blocks are selected from the group consisting of:

(a) oligomer groups formed by two or more oligo (ethylene glycol) methyl ether methacrylate (OEGMA) compounds having molecular weight different from one another, wherein said OEGMA compound has a mean molecular weight (Mn) within the range 100-10,000 Dalton (0.1 kg/mol-10 kg/mol); and (b) a co-polymer formed by OEGMA as a first co-monomer and by hydroxyethylmethacrylate (HEMA)-polylactide as a second comonomer;

and wherein the block B is selected from the group consisting of:

(c) poly (ethylene glycol) chain (PEG, HO-[CH$_2$CH$_2$-O]$_n$-H), where n is a whole number comprised between 30 and 300; and (d) an oligomer group formed by one or more repeat units selected from:

(meth) acrylic acid, polymerisable esters comprising polyoxyethylene chains-[-CH$_2$-CH$_2$-O]$_r$-H where r is an integer number within the range 10-500, potassium 3-sulfopropyl methacrylate, (meth) acrylamide, 2-hydroxypropyl methacrylamide, glycerol monomethacrylate, methacryloyloxyethyl phosphorylcholine, carboxybetaine, sulfobetaine and combinations thereof.

* * * * *